April 5, 1966  A. H. BRIDGE, JR., ETAL  3,244,215
TIRE CORD ENDINGS
Filed Nov. 14, 1963
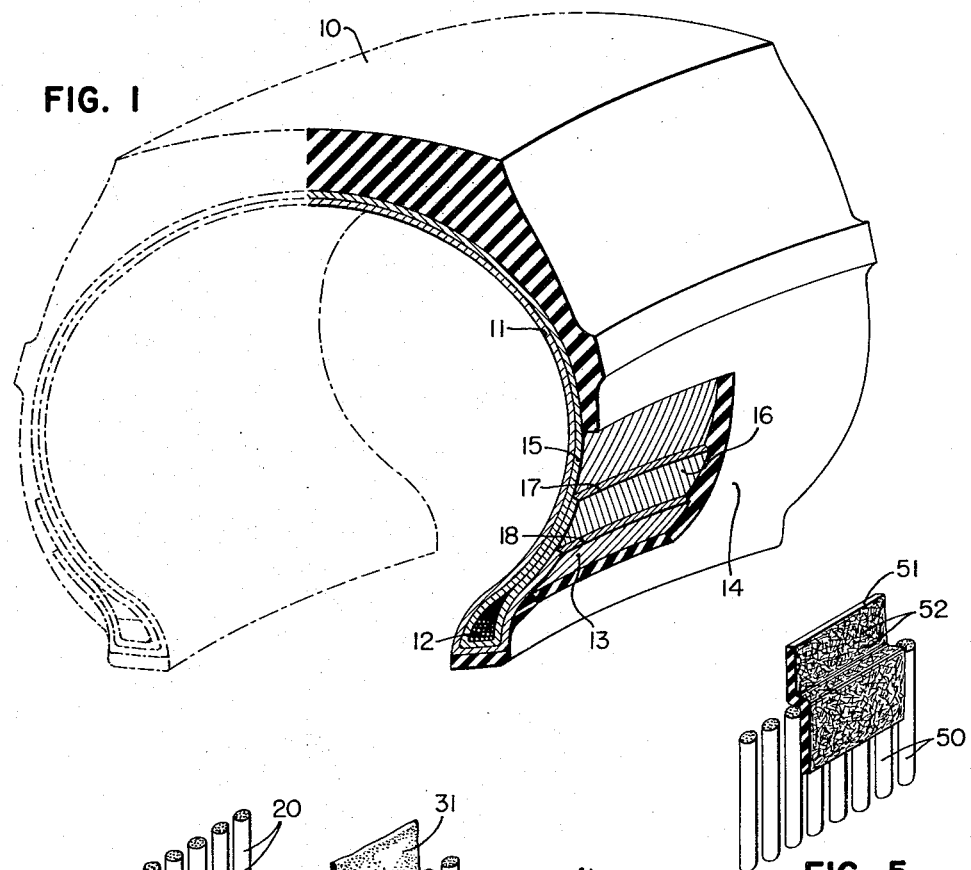
FIG. 1
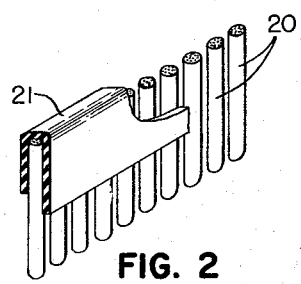
FIG. 2
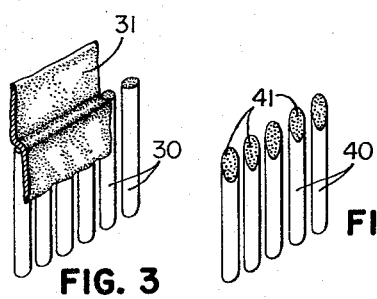
FIG. 3
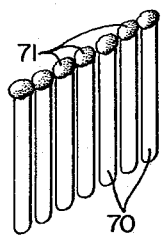
FIG. 4
FIG. 5
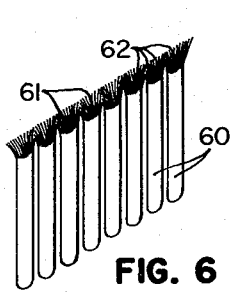
FIG. 6
FIG. 7
*INVENTOR.*
ARNOLD H. BRIDGE, JR.
ROBERT C. JENKINS
BY CRANDALL R. KLINE, JR.
*JB Holden*
ATTORNEY 3,244,215
TIRE CORD ENDINGS
Arnold H. Bridge, Jr., and Robert C. Jenkins, Cuyahoga Falls, and Crandall R. Kline, Jr., Akron, Ohio, assignors to The Goodyear Tire & Rubber Company, Akron, Ohio, a corporation of Ohio
Filed Nov. 14, 1963, Ser. No. 323,734
9 Claims. (Cl. 152—356)

This invention is concerned with the ends of reinforcement cords in pneumatic tires and more particularly the invention involves an improved system of anchoring the reinforcement cord ends to the tire carcass by bonding and shaping.

In the conventional pneumatic tire the reinforcement cord is positioned in parallel orientation within the tire in several rubber coated layers or plies. Passenger tires have for some time been standard at 4 or 6 plies, whereas truck and airplane tires may have as high as 20 plies. When a large number of plies are utilized in a pneumatic tire the individual cords must be by necessity of small diameter. The small diameter reinforcement cords can be terminated along the tire sidewall without causing an appreciable abrupt change or stress discontinuity.

With the advent of pneumatic tires containing so-called "giant cords" the number of plies of cord reinforcement has been reduced in some instances to 2 plies. Because of the reduced number of plies, the individual cords must be increased in diameter to provide adequate strength. The increased reinforcement cord diameter then presents a problem in that the ends thereof disrupt continuity of the tire sidewall. As the tire sidewall undergoes bending, there is a tendency for separation to occur where the cords terminate, thus damaging load carrying capabilities of the tire.

Accordingly, the principal object of the present invention is to provide a new and improved method of adhering the reinforcement cord ends to the tire carcass.

Another object of the present invention is to provide a pneumatic tire in which the large cord endings are adhered to the carcass with a greater tenacity than has heretofore been readily attainable.

A further object of the invention is to form the cord endings so that there is a smooth transition from the cord endings to the tire carcass, thus creating a more even stress distribution.

These and other objects of the present invention will become apparent from the following description and the drawings in which:

FIG. 1 is a perspective view showing a cutaway portion of the tire sidewall in section;

FIG. 2 shows an enlarged view of cord ends containing a wraparound rubber strip;

FIG. 3 shows ordinary cord ends that have been bonded together;

FIG. 4 depicts cord ends that have been skived;

FIG. 5 shows cord ends incorporating a filament impregnated rubber strip;

FIG. 6 shows cord ends that have been crushed to spread the filaments laterally; and FIG. 7 shows cord ends that have been melted to fuse the ends of the filaments together.

In FIG. 1 a perspective view of a tire is represented at 10. Cord reinforcement is employed in the following manner:

An inner ply 11 of cord reinforcement is angularly positioned around the internal periphery of the tire carcass. The edge 13 of ply 11 is then folded around bead wire 12 and then is positioned adjacent and in contact with carcass sidewall 14. Since a tire of two-ply construction is shown, ply 15 is positioned contiguous to ply 11; however, the angle of the reinforcement cords is angularly disposed with respect to the reinforcement cords of ply 11. End 16 of ply 15 also terminates along sidewall 14 after it has encompassed bead wire 12. The reinforcement cords of end portions 13 and 16 form a well-defined stress discontinuity along lines 17 and 18. The above positioning of ends 13 and 16 are merely illustrative and it would be entirely possible to extend end 13 so that it overlaps end 16.

In order to provide a pneumatic tire that will resist separation along lines 17 and 18, various improved cord treatments have been discovered to give improved results as will be hereinafter described in detail.

FIG. 2 represents the cord ending as at 13 and 16 of FIG. 1. Cords 20 are pictorially shown without angularity in order to show more clearly the details of the invention. It is to be understood that although a tire is shown in which the reinforcement is angularly disposed, the present invention applies equally well to tires of radial cord construction. The ends of cords 20 are large with respect to heretofore utilized tire reinforcement cords. The conventional tire reinforcement cord has a total denier in the range of 840 to 2520. For the purpose of identifying "large," any cord having a total denier greater than 3500 can be considered as a large cord. When conventional reinforcement cords are incorporated in a tire, the cut cord ends are not a serious problem because there is only a small area of exposed fabric to contend with. The adjacent layers of rubber stock can readily flow over the ends and effectively unite therewith. With large cords, the adjacent rubber cannot flow over the exposed large cord fiber ends and effectively adhere to them. The unvulcanized rubber is capable of flowing and abutting the large cord ends during curing; however, in the initial large cord treatment the various dips used to improve adhesion between the rubber and the cord surface does not necessarily penetrate through the entire mass of filaments that comprise the large cord. It is apparent that in a small cord the ratio between the treated exterior and the untreated interior is not nearly as great as in a large cord since in either case the penetration of adhesive will be approximately the same. Consequently, the innermost filaments are essentially untreated; hence, will not adhere well to the adjacent rubber. An additional unvulcanized rubber strip 21 has been found to give improved resistance to separation along the large cord ends. Unvulcanized rubber strip 21 contains additional ingredients milled therein to enhance the bonding characteristics thereof. It has been found that when rubber stock 21 is modified by incorporating hexamethylene tetramine and resorcinol a superior cord to rubber bond is provided. The hexamethylene tetramine and resorcinol are introduced into the rubber stock in powder form and are thoroughly milled. During vulcanization of tire 10, the formaldehyde producing agent, hexamethylene tetramine, enters in combination with the resorcinol, thus forming a resin system that bonds chemically with the large cord ends and adjacent rubber. A primary advantage of the heretofore described bonding system is that a chemical bond is produced between the centermost cord fibers, which may be untreated by the preparatory cord dip process, and the adjacent rubber of sidewall 14.

FIG. 3 shows the end of a fabric layer such as 13 or 16 depicted in FIG. 1. The ends of the large cords 30 are painted or coated with a resorcinol-formaldehyde resin 31 adhesive, thus insuring an adequate bond in the completed tire.

FIG. 4 shows large cord ends 40 that have been skived at 41, thus reducing the load concentration at the extremity of the cord ends. The angular cut upon the cord ends is preferably in the range of one-half to two diameters in length. The skived large cord ends can be supplemented by incorporating a rubber strip around the cord ends as in FIG. 2, utilizing an adhesive as in FIG. 3 or using a filament impregnated rubber strip as will be hereinafter described.

FIG. 5 shows large cord ends coupled with a rubber strip 51 that contains filamentary material 52. Large cords 50 can be terminated with a perpendicular cut or can be skived as shown in FIG. 4. Rubber strip 51 is incorporated in the unvulcanized state and preferably has milled therein resorcinol and a formaldehyde producing agent such as hexamethylene tetramine. Also included within the rubber stock is an unoriented dispersion of filamentary material such as shredded wire or nylon filaments. Strip 51 is positioned so that it contacts the exterior side of large cords 50 and bridges across upon the adjacent sidewall of the tire. When pressure is applied during curing, rubber strip 51 and its resin producing ingredients bonds to the sides of the cords and also the cut ends of the cords. Separation at the ends of the cords is thus minimized because the strong filamentary containing rubber strip 51 distributes part of the load from cord end to the sidewall. Also, the filaments in strip 51 help to keep the rubber stock from being displaced during cure so that in the cured tire the cut surfaces of cords 50 are separated by a rubber cushion from the adjacent ply.

An alternate method of positioning strip 51 can be effected by placing strip 51 underneath, or radially inward, of ends 50. In this manner, ends 50 will be forced into strip 51 during vulcanization thus providing a firm bond and also transitional cushion between cord ends 51 and the adjacent reinforcement layer such as 15, FIG. 1.

FIG. 6 shows large cords 60 that have the ends thereof crushed or flattened as at 61. Ends 61 are mechanically flattened so that the individual filaments 62 are angularly disposed with relationship to their normal position within the cord. By flattening the ends of the reinforcement cord, a smooth transition is made for the overlaying rubber. The spread apart filaments also will receive an adhesive such as shown in FIG. 3 during the tire building operation in a more even distribution, thus effecting a stronger bond in the completed tire. A gradual transition in the cord ply thickness such as is provided by flattened ends 61 permits greater flexure without resulting in separation of the cord ends from the remainder of the tire sidewall.

FIG. 7 shows large reinforcement cords 70 in which the ends have been fused or melted. Fusing is readily accomplished by the application of heat to thermoplastic cord materials, such as nylon or polyester. By fusing together the filaments, all the stress carrying elements of each cord are anchored together and offer an uninterrupted surface 71 for the bonding of adjacent rubber overlay strips or sidewall rubber. In this manner, the central filaments of cord 70 are definitely anchored, whereas with an adhesive system alone there exists the possibility that there may be inadequate penetration of the interstices; hence an uneven load distribution over the cord filaments will result.

The various ways in which the ends of large reinforcement cords are treated to achieve superior performance in a pneumatic tire have been set forth above.

While certain representative embodiments and details have been shown for the purpose of illustrating the invention, it will be apparent to those skilled in this art that various changes and modifications may be made therein without departing from the spirit or scope of the invention.

We claim:

1. In a pneumatic tire the improvement comprising an elastomeric carcass containing at least one reinforcement ply having a plurality of adjacent cords each of a denier greater than 3500, said reinforcement ply disposed in said carcass such that the edges thereof fold around the bead reinforcement and terminate exteriorly of and contiguous with the reinforcement ply in the tire sidewall, a layer of bonding material placed against the severed cord ends and the sidewall to prevent separation occurring in the tire.

2. A tire as claimed in claim 1 in which said layer is placed around and in contact with the cord ends so as to extend along both sides of said ply.

3. A tire as claimed in claim 2 in which said layer is a vulcanizable elastomeric material impregnated with a powdered resorcinol resin and a powdered formaldehyde producing agent.

4. A tire as claimed in claim 3 in which the formaldehyde producing agent is hexamethylene tetramine.

5. A tire as claimed in claim 1 wherein said layer is positioned so as to extend along one side of said ply adjacent the end thereof and also extend along the reinforcement ply that forms the tire sidewall.

6. A tire as claimed in claim 5 wherein said layer is a rubber cement containing a powdered resorcinol resin and powdered hexamethylene tetramine.

7. In a pneumatic tire the improvement comprising an elastomeric carcass containing at least one reinforcement ply having a plurality of adjacent large diameter cords which have the ends thereof thermally fused together to provide an increased end area, said reinforcement ply disposed in said carcass such that the edges thereof fold around the bead reinforcement and terminate exteriorly of and contiguous with the reinforcement ply in the tire sidewall, said cord ends having an elastomeric layer placed contiguous the thermally fused portions thereof, the exposed cord ends of said ply having an increased area for bonding thereto by the elastomeric material within the tire carcass.

8. The method of making a tire comprising the following steps:
   (1) positioning at least one ply of reinforcement cord around the circumference of a tire building mandrel;
   (2) locating bead reinforcement wire intermediate the ends of said ply;
   (3) folding the ply back upon itself and surrounding said wire so that the ends thereof are contiguous with the sidewall area;
   (4) treating the cord ends to prevent separation in the finished tire;
   (5) wrapping the exposed cord ends with a vulcanizable elastomeric layer positioned against the ends and along both sides thereof; and,
   (6) Curing the tire by the application of pressure and heat thus bonding the treated cord ends into an integral part of the tire carcass.

9. The method of making a tire as claimed in claim 8 in which the cord ends are thermally fused together.

References Cited by the Examiner
UNITED STATES PATENTS

| | | | |
|---|---|---|---|
| 2,884,041 | 4/1959 | Mullen | 152—367 X |
| 2,947,341 | 8/1960 | Hershey | 152—362 |
| 2,958,360 | 11/1960 | Malklem et al. | 152—354 |
| 2,991,817 | 7/1961 | Gay et al. | 152—356 |
| 3,050,098 | 8/1962 | Grote | 152—354 |

FOREIGN PATENTS

| | | |
|---|---|---|
| 608,947 | 9/1948 | Great Britain. |

ARTHUR L. LA POINT, *Primary Examiner.*